3,674,589
METHOD OF FABRICATION AND REINFORCING HIGH SOLIDS-CONTAINING MATERIALS
Carl K. Schaab, Dayton, George T. Weyrauch, Miamisburg, and Terry R. Davis, Spring Valley, Ohio, assignors to The National Cash Register Company, Dayton, Ohio
No Drawing. Filed Feb. 28, 1969, Ser. No. 803,478
Int. Cl. B29c 31/00
U.S. Cl. 156—245                               18 Claims

ABSTRACT OF THE DISCLOSURE

This disclosure is directed to an improved method for preparing fabric-reinforced molded plastic articles and involves the utilization of at least one prebonded composite of a fabric reinforcing material and a coherent layer of mold release material which is substantially impervious to non-solvent liquids, the two being adhered by an adhesive whose bond strength is diminished significantly subsequent to molding. The diminution in the adhesive bond which occurs during the molding and/or curing allows the mold release sheet to be removed readily from the fabric (surface) reinforced molded article without any significant surface deformation thereto. Both woven and non-woven fabrics can be employed; but for most molded articles, the use of woven cloth or woven fabric is preferred. In the case of molded circuit boards, a preferred fabric reinforcement is "Dacron" cloth; a preferred solid mold release sheet material is "Mylar" (polyethylene glycol terephthalate) a preferred adhesive to prebond the reinforcing cloth to the mold release sheet is a compatible polyester adhesive and a preferred class of molding plastics is epoxy resins.

---

In the preparation of molded fabric-reinforced plastic articles, especially those which are comparatively thin in relation to their length and width, it is known that a high measure of structural support is provided by locating the fabric reinforcement in a surface region, viz, at or close to the outer surface(s) of the article. For example, if a fabric-reinforced plastic article is to be molded and only one fabric sheet is available for reinforcement; a greater extent of reinforcement is provided by locating said fabric at or in immediate proximity to either major surface region thereof as compared to locating it internally, e.g., in the center. The use of fabric reinforcement in the surface region of a molded plastic article, esp., one which is comparatively thin, has been found to present special problems especially when said fabric-reinforced molded plastic article is to be used as a substrate for a circuit board that is to contain a printed circuit or other electrically conductive component. In such cases it is desirable and often necessary for the surface(s) on which the printed circuit is to be deposited to be substantially smooth and resistant to moisture.

When it is desired to mold fabric-reinforced plastic articles containing a high solids content, e.g., in excess of 50 weight percent solids and more usually between about 60 to about 85 weight percent solids; the problems experienced in producing satisfactory molded composites are even greater due to the difficulty of working with and reinforcing a filler-loaded plastic molding material which is highly viscous or thixotropic.

One of the difficult problems encountered when using surface located fabric-reinforcement is that the resultant article has a poor surface(s) for deposition of a circuit in that the resultant molded article can be wrinkled, warped, and can contain air bubbles or voids. Any one of these defects detract from the desired properties for molded articles. This surface irregularity problem is especially acute when the molded article is to be used as a printed circuit board. In such cases, surface irregularities or voids not only detract from the ability to lay down or deposit electrically conductive components, such as complex printed circuits, but also can result in problems with respect to resistance to moisture (which can cause short circuits by permiting the absorption of environmental water) reduction of flexural strength, and other deleterious electrical properties, especially with respect to surface resistivity and volume resistivity of the circuit board.

The present invention enables the production of fabric (surface) reinforced molded plastic articles of improved uniformly smooth and comparatively void-free surface characteristics while overcoming substantially the previously mentioned problems. By providing a substantially smooth, void-free surface, the present invention enables the attainment of improved electrical properties including surface resistivity and volume resistivity, leads to reduced water absorption and in general provides a better support for deposition and development of an electro-conductive portion on the surface of such fabric-reinforced molded plastic article. That is to say that the smooth, comparatively void-free, comparatively water absorption-resistant molded article achievable by the use of process of this invention provide excellent substrates for development of printed circuits thereon. This invention is particularly useful in forming fabric (surface) reinforced molded plastic articles of a configuration having the major surfaces essentially parallel and distinctly greater in size than the minor, e.g., edge, surfaces. Such molded articles can be flat or curved.

The key to the present invention is believed to be the discovery that by positioning a pre-bonded reinforcing fabric-mold release sheet composite with the fabric-reinforcing material located in at least one surface region and in contact with the molding plastic medium prior to molding, the aforementioned problems can be largely surmounted. The term "molding plastic medium" as used herein means the material being molded which contains plastic and usually some filler material and curing catalyst for the molding plastic. The term is not intended to include the fabric reinforcement or the mold release sheet. By use of a prebonding adhesive whose adhesive (bond) strength is significantly diminished in the mold operation, the removal of the mold release sheet subsequent to molding is enhanced greatly. For example, when the molding plastic matrix is an epoxy resin, when the surface fabric reinforcement is woven "Dacron" (polyethylene glycol terephthalate), the self-supporting mold release sheet is 0.5 to 1.0 mil thick "Mylar" (polyethylene glycol terephthalate in sheet form) and the prebonding adhesive(s) for the fabric-mold release sheet composite are commercial polyester resin, such as the Du Pont Industrial Adhesives "46930," "46950" and "46990"; the mold-release sheet material can be readily stripped from the laminated assembly, which now incorporates the fabric reinforcement, subsequent to molding. The commercially available prebonding adhesives "46930," "46950" and "46990" are solution-type polyester adhesives modified with synthetic rubber and provided in solution form in such solvents as ethers, e.g., dioxane hydrocarbons, ketones; chlorinated hydrocarbons, e.g., trichloroethane; etc.

It is essential to obtain the benefits of the invention that the fabric-reinforcement be in contact with the molding plastic medium with the mold release sheet side located outwardly. It is also necessary that the fabric-reinforcement be bonded to the mold release sheet prior to the molding operation. In fact a control test was conducted with unbonded woven "Dacron" fiber faced inwardly in contact with the epoxy resin on both surfaces (said "Dacron" fiber being in contact with but not bonded to "Mylar" mold release layers); and the resulting molded laminate was unsatisfactory due to the same problems mentioned hereinabove and sought to be remedied by this invention, viz, warping, wrinkling, and the presence of irregular outer surfaces containing voids.

The present invention is particularly well suited to molding and laminating operations involving the use of very low to moderately high molding temperatures and comparatively low extraneous pressures. Typical molding temperatures, which fit such categories, range from about 32 to 350 degrees Fahrenheit and more usually from about 150 to 170 degrees Fahrenheit. The pressures employed characteristically range from about 10 to about 500 p.s.i.g. (pounds per square inch gauge) and more usually range from about 20 to 100 p.s.i.g. Of course, the specific molding conditions used will depend largely upon the molding plastic(s) selected, fabric reinforcement, fillers, etc.

While the weight percent of fabric reinforcement (either nonwoven or woven fabric) can range widely from about 0.5 to about 85 weight percent based on the total ingredients of the fabric-reinforced molded plastic article but excluding the mold release layer; usually the concentration of fabric reinforcement ranges from about 1 to 25 weight percent and more usually from about 1 to about 15 weight percent. The use of woven fabric reinforcement is generally preferred due to its ability to impart a greater extent of reinforcing strength at the surface of the composite molded articles and its ability to break up gas bubbles during molding.

Destructible circuit boards

Frequently, it is desirable or necessary, esp. in military applications, to destroy or disfigure specific structures and/or equipment so that their identity and function remain anonymous. In such cases the time required for destruction can be of paramount importance. Also, it is often necessary that the structure to be destroyed contain within itself the materials and methods for its own destruction. Structures having these capabilities are frequently referred to as on-command, self-destructive systems. While it is possible to prepare such systems using explosive compositions in which an explosive charge(s) are placed on various portions of or in a location close to the device to be destroyed; such systems frequently result in a non-selective destruction of the surrounding installation with danger to personnel. Consequently, there has developed a need for on-command, self-destruct structures whereby only the desired portion to be destroyed is affected by the destruct mechanism. This requires a controlled or limited destruction to take place.

The use of one or more encapsulated pyrotechnic or incendiary components in prescribed concentrations as a latent self-destruct mechanism in the form of an incendiary filler material for the molding plastic enables these objectives to be achieved because it permits rapid yet nonexplosive combustion when the system is ignited, e.g., by conventional fuses and other firing devices placed in communication with the plastic incendiary filler molding medium. In essence the encapsulated incendiary component is present as a profusion of capsules randomly yet substantially uniformly distributed in and confined by the molded plastic.

When the fabric (surface) reinforced molded plastic article does serve as a substrate for a self-destructible circuit board, the concentration of fabric-reinforcement characteristically ranges from about 0.5 to about 30 weight percent and more usually ranges from about 1.5 to 10 weight percent (again based on the total components for the fabric-reinforced plastic molded article, not counting the mold release layer material). When the molded plastic articles contain such incendiary or pyrotechnic fillers; the concentration thereof in the plastic molding medium can range from about 10 to 85 weight percent, usually ranges from about 40 to 85 weight percent and more usually ranges from about 65 to 80 weight percent.

It is not always necessary for all components of the incendiary filler material to be encapsulated. In general the incendiary component(s) which are difficult to maintain inert against autogenous combustion or ignition while in the presence of the remaining incendiary component(s) are the ones which will have to be encapsulated with the encapsulation of the remaining component(s) being optional. However, it is, of course, possible to encapsulate all incendiary components. Most incendiary fillers for these self-destruct type circuit boards are comprised of two main components, fuel and oxidizer. Of the total incendiary fillers, either the fuel or the oxidizer can be present in predominant amounts. For example, an incendiary filler can contain from about 30 to 80 weight percent oxidizer with a corresponding fuel content of from about 20 to about 70 weight percent (based on the total of fuel and oxidizer). Characteristically, however, the concentration of oxidizer is more than that of the fuel component and usually the incendiary filler will contain from about 50 to about 80 weight percent oxidizer and a corresponding concentration of from about 20 to about 50 weight percent fuel. For most fabric (surface) reinforced epoxy molded circuit boards, the preferred concentration of oxidizer in the incendiary filler ranges from about 60 to 80 weight percent with the remaining 20–40 weight percent being fuel.

Incendiary fillers

Suitable exemplary fuel components which can be employed in particulate form and more usually thoroughly ground form (usually less than about 500 microns in average diameter) include, but are not limited to, the following: boron (usually in particle sizes of 50 microns or less on the average), aluminum (usually in particle sizes averaging about 10 microns or less in diameter), magnesium, calcium silicide (usually having an average particle size of about 500 microns or less), titanium, beryllium, lithium, sodium, phosphorous, silicon, alloys of two or more of these materials, etc.

Suitable oxidizers which can be employed include, but are not limited to, the following: perchlorates, esp. alkali metal perchlorates, such as potassium perchlorates, sodium perchlorate, lithium perchlorate; nitrates, such as sodium nitrate, potassium nitrate, silver nitrate, etc.; lead and iron salts, such as $Pb_3O_4$, $Fe_2O_3$; alkali metal and other permanganate salts, e.g., potassium permanganate, sodium permanganate, lithium permanganate; etc.

Non-incendiary fillers

In addition to the incendiary components in the filler, or in place thereof (as in articles which need not possess the self-destruct capability), other filler materials can be used, such as, titanium dioxide, and other pigments, dyes and related coloring components; flame retardant particulate and non-particulate components, esp. halogen compounds, antimony oxides, etc.; intumescents, such as, polyurethanes; metal particles or flakes, e.g., iron, steel and copper metals in particulate form; asbestos; ground glass; etc. Of course, no filler whatsoever need be employed in which case the entire molding plastic medium is molding plastic (with or without associated catalysts).

Molding plastics

The molding plastic is usually, but not necessarily, in a highly flowable form prior to molding, that is, at ambient temperature conditions employed in making the lay-up (or assembling the fabric reinforcement and molding plastic) on or in the mold. Preferably the molding plastic is in liquid form at the molding temperatures used, that is, prior to the curing thereof. Suitable molding plastics which can be employed in accordance with this invention include both thermosetting and thermoplastic resins. Suitable exemplary molding plastics included, but are not limited to, the following: epoxy resins, (condensation products of epihalohydrins, e.g., epichlorohydrin, and polyols), e.g., "Bisphenol-A" (p,p'-isopropylidene diphenol); phenolplast and aminoplast condensates, e.g., phenol - formaldehyde condensates, resorcinol - formaldehyde condensates, urea-formaldehyde condensates, melamine-formaldehyde condensates, etc.; cellulosic resins, e.g., cellulose acetate, cellulose acetate butyrate, cellulose butyrate, cellulose nitrate, nitrocellulose; polyester resins, such as the condensates and reaction products of polyhydric alcohols, e.g. ethylene glycol, diethylene glycol, glycerol, pentaerythritol, trimethylol propane, polybutylene glycols, castor oil, etc. with polybasic organic acids, e.g., oxalic acid, adipic acid, sebacic acid, phthalic acid, isophthalic acid, terephthalic acid, 6-amino-caproic acid, malonic acid, succinic acid, maleic acid, fumaric acid, itaconic acid, etc.; polyurethanes, e.g., those prepared by reacting polyhydroxy materials (such as those mentioned above in conjunction with polyesters) or hydroxy-containing polyethers, polyamines, or the polyesters, themselves, with organic polyisocyanates, usually aryl diisocyanates or triisocyanates, e.g., toluene diisocyanate; polyolefins (homo- and copolymers) e.g., polyethylene, polypropylene, polybutadiene, ethylene-propylene copolymers including terpolymers of ethylene, propylene and one or more $C_4$ to $C_8$ conjugated or non-conjugated diolefins; vinyl chloride-vinyl acetate copolymers; acrylic resins such as, polyalkyl acrylates and methacrylates, e.g., polymethyl acrylate, polyethyl acrylate, polybutyl acrylate; polymethyl methacrylate; polystyrenes (homopolymers and copolymers); copolymers of monoolefinically unsaturated monomers with vinyl esters, etc., copolymers of ethylene and vinyl acetate; natural and synthetic elastomers including graft copolymers, e.g., of butadiene-1, 3 and acrylic acid; mechanical polyblends, e.g., physical mixtures of polymers, such as vinyl chloride homopolymers and copolymers with ethylene-vinyl acetate copolymers, e.g., mixtures of polyvinyl chloride with ethylene-vinyl acetate copolymer; polyamides and other nylon molding resins; silicone resins, including poly alkyl siloxanes, e.g., polymethyl siloxane; polyvinyl aldehydes, such as polyvinyl butyraldehyde (polyvinyl butyral); polycarbonates; mixtures of any two or more of the above molding plastics; etc.

Fabric reinforcement

The fabric reinforcement materials employed in accordance with the improved method of this invention can be any woven or non-woven fabric capable of bonding to a mold release material in coherent form, e.g., a film, sheet or layer of mold release material which is nonporous and substantially impervious to non-solvent liquids. Thus, suitable exemplary woven and non-woven fabric reinforcement materials include, but are not limited to, the following: "Dacron" (polyester fabric made from polyethylene glycol terephthalate); nylon; glass fabric; "Orlon" (acrylic fiber made from polyacrylonitrile); "rayon" (regenerated cellulose); polyolefin fabric, e.g., polypropylene, polyethylene, etc. Characteristically the woven fabric reinforcement and mold release sheet are substantially coextensive, viz., are of substantially the same length and width. The use of woven fabric is preferred in accordance with this invention. Non-woven mats, especially smooth surfaced non-woven mats, can be employed however. While the surface reinforcement feature is essential to the present invention, it should be clearly understood that additional forms of fabric reinforcement can be utilized in conducting the improved molding process of this invention. For example, one or more woven glass fabric layers or other forms of fabric reinforcement can be positioned in approximately the center of the molded article to secure additional reinforcement thereof. Such an article then has at least three fabric reinforcement layers, one centrally located and one at both major surface regions thereof.

Mold release material

The release material can be "Mylar" or any other material equivalent thereto in its ability to release from the metal or other mold surface(s) and delaminate readily from the fibrous reinforced mold article subsequent to its formation. Suitable exemplary mold release materials in coherent form (which can be in sheet, film layer or equivalent form) include, but are not limited to, the following: polyethylene; polypropylene; polytetrafluoroethylene ("Teflon"); monochlorotrifluoroethylene ("Kel-F"); polyvinyl fluoride; silicone resins, polyester resins; etc.

Prebonding adhesive

The adhesive bond strength of the prebonding adhesive at normal room temperatures, viz., about 20 to 25 degrees centigrade (about 68 degrees Fahrenheit to about 77 degrees Fahrenheit) is usually less than about 15 pounds per inch (p.p.i.) and characteristically less than about 10 p.p.i. At the more elevated temperatures used during molding, e.g., 150 degrees Fahrenheit and higher (and subsequent to cooling), the adhesive bond strength of the prebonding adhesive is usually significantly less than it is at room temperature, viz., less than about 5 p.p.i. and more usually less than about 3 p.p.i.

As noted above, the prebonding adhesive should be one which has a sufficient bond strength at normal room temperatures to adhere the fabric reinforcement to the mold release sheet prior to molding, but whose adhesive bond strength subsequent to molding is sufficiently low to permit delamination of the mold release sheet without significant surface deformation of the molded article in the reinforced surface regions(s). Satisfactory exemplary prebonding adhesives include, but are not limited to, the following: polyester resins; epoxy resins; urethane resins; nitrile rubbers; butadiene-styrene copolymers; butadiene-acrylonitrile copolymers; polystyrenes (homo- and copolymers); acrylic resins, such as, acrylates and methyacrylates, e.g., polymethyl acrylate, polymethyl methacrylate, poly n-butyl methacrylate. Characteristically, the fabric reinforcement and the mold release sheet are bonded (adhered) with an extraneous adhesive throughout at least a predominant portion of their mutual interfacial surface extends, that is, the points or areas at which the fabric comes closest to or contacts the comparatively smooth mold release film, sheet, or layer. Just exactly what happens to the prebonding adhesive during the molding operation is not readily understood. However, it is plausible that the adhesive could be dissolved by the epoxy or other molding plastic during the molding, e.g., in the curing cycle. Also, it is possible that a portion of the prebonding adhesive (due to the temperatures employed during the molding) moves through the openings of the woven fabric structure into the region of the matrix molding plastic. In any event, the prebonding adhesive apparently leaves the points of juncture of the fabric-reinforcement and mold release material because subsequent to molding and delamination there appears a smooth surface on what was the apparent interface of the mold release film and fabric reinforcement. Thus the substantial absence of the previous prebonded adhesive points suggests the migration of the prebonding adhesive.

The present invention has been found to produce greatly improved results with respect to the above-mentioned desired properties especially when the molded article is prepared by "press molding" or calendering. The term "press molding" as used herein is employed to denote molding procedures wherein a molding plastic medium is placed between two sheets of mold release material and pressed between the plates of a platen press to impart substantially the final configuration to the article. Usually spacers are employed at each corner and the plates are closed until a positive guage pressure is observed. In cases where a thermosetting molding plastic is employed in press molding, the article can be cured in situ in the press mold, or it can be removed therefrom after pressing and placed in an oven to cure.

Characteristically the molding procedure (usually inclusive of a curing cycle in the case of thermosetting plastics) employs heat and results in consolidation of the fabric reinforcement and the molding plastic medium into a unitary structure.

Calendering operations have been referred to as molding procedures herein because usually the concentration of the molding plastic medium employed in conjunction, with the woven fabric significantly predominates the fabric concentration, viz, the articles (whether made by molding or "calendering") usually contain from 55 to 99.5 weight percent molding plastic medium based on the total of plastic, filler(s) catalyst(s) and fabric reinforcement. While the improvements of the present invention are demonstrated hereinbelow in great detail utilizing the two types of molding procedures, the present inventors believe that this improved procedure is likewise applicable to other molding techniques also, especially those utilizing low pressures.

Encapsulation of incendiary filler component(s)

As noted above, the molding plastic medium can contain encapsulated incendiary fuel and/or oxidizer components as incendiary filler. These capsules are in effect small microspheres having as their internal phase the incendiary component and as an external phase the capsule cell wall material. Such capsules can range in size from about 1 to about 1,000 microns, usally from about 5 to 600 microns and more usually from about 10 to 500 microns. A variety of both chemical and mechanical encapsulation procedures can be employed to form capsules containing various incendiary components. Suitable chemical encapsulation procedures for making capsules ranging in size up to about 80 microns can be found in the U.S. Pats. 2,800,457 and 2,800,458. Chemical (en masse) encapsulation procedures for use with incendiary components such as metallic fuels and oxidizers can utilize a wide variety of capsule cell wall materials.

Suitable cell wall materials include, but are not limited to, the following: gelatin-gum arabic hardened with glutaraldehyde (with or without other adjuvant materials such as copolymers of ethylene and maleic anhydride or phenolplast condensates, e.g., phenol-formaldehyde, resorcinol-formaldehyde), etc.; phenol-formaldehyde condensates; aminoplast condensates, such as urea-formaldehyde, melamine-formaldehyde; polyvinyl alcohol, ethyl-cellulose; polyvinylidene chlorides ("saran"); polycarbonates, e.g., carbonate linked polymers produced by reacting "Bis-phenol A" and phosgene such as "Lexan"; chlorinated polyolefins, e.g., chlorinated polypropylene, such as "Parlon." Moreover, each such capsule or some of them can have a plurality of substantially concentric walls, e.g., a primary or inner wall of gelatin-gum arabic, with a secondary (outer) wall of such materials as nitrocellulose, ethylcellulose or wax. Further more, all or a portion of the capsules can have a composite cell wall, viz, one in which a plurality of wall-forming components participate in cell wall formation in the manner of intimately associated or chemically complexed components, e.g., a composite cell wall of gelatin-gum arabic and an in-situ formed condensate of resorcinol and formaldehyde.

In addition to chemical encapsulation procedures, the capsules can be formed by mechanical procedures for encapsulation. Further information on a variety of known mechanical encapsulation procedures along with some other chamical encapsulation procedures can be found in "Microencapsulation" by Anderson et al. (Harvard M.B.A. Canditates Report) published by Management Reports, Boston, Massachusetts (1963).

It is often advisable, and sometimes necessary, to encapsulate certain reactive or comparatively unstable incendiary components when they are included as incendiary fillers in with the matrix plastic. Such rather sensitive materials include fuels such as metallic alluminum and magnesium particles, and certain oxidizer salts, such as, perchlorates, nitrates, and permanganates. On the other hand, other fuels and oxidifiers need not be encapsulated, e.g., boron, lead oxide, iron oxide, etc.

Printed circuits

When the fabric (surface) reinforced molded plastic articles are to be employed as circuit boards, the mold release sheet must be removed (stripped) subsequent to the molding procedure and prior to deposition of the electroconductive component thereon. Subsequent to the removal of the mold release sheets, the electroconductive portion can be established on either or both major outer surfaces thereof in accordance with known procedures. Suitable electrically conductive materials which can be used include, but are not limited to, the following: various electrically conductive metal foils, such as tin, copper, aluminum, palladium-clad aluminum pyrochemical foil, viz, metallic foil comprised of a thin core of aluminum having on both its upper and lower surfaces even thinner films of palladium; etc. Electroconductive circuits can be developed from the foil by conventional masking and etching techniques. Usually the foil is first adhered to the cleaned upper surface of the molded article using any suitable adhesive and then the portions of the metal foil corresponding to the desired final circuit pattern are masked with acid-resistant material. Subsequent acid etching removes the unwanted portions of the foil and the masking is removed to result in the finished circuit. When an incendiary or pyrotechnic filler is included within the molding plastic medium, the molded circuit boards can be made with openings for igniters, e.g., such conventional igniters as electric impulse igniters, heat igniters, etc. The electric impulse igniters are usually comprised of a pyrofuse wire which ignites by heat from an electrically triggered alloying reaction between palladium and aluminum metals. Such as igniter can be fabricated in different sizes to fit the particular ignition requirements and circuit board sizes. Usually the igniters are located so that they are in direct communication with the interior of the molded laminate structure, viz, with at least a portion of the encapsulated incendiary composition.

The invention will be illustrated in greater detail by the examples which follow. It should be understood, however, that these examples are included herein for illustrative purposes only. Accordingly, they should not be construed as limiting the present invention.

EXAMPLE 1

This example provides a comparison of known molding procedures versus the improved molding method of this invention. Data relating to essential properties of molded circuit board substrates resulting from such molding procedures clearly establish the highly desirable combination of properties attainable by practice of this invention, viz., excellent resistance to water absorption, good electrical properties of surface resistivity and volume resistivity and avoidance of voids and surface distortions while maintaining high flexural strength. The types of molding procedures compared are:

(A) Casting with no fabric reinforcement;
(B) Press molding with no fabric reinforcement (using mold release side of prebonded composite in contact with molding medium);
(C) Press molding with fabric reinforcements and mold release sheets but not prebonded-fabric sides in contact with molding medium; and
(D) Press molding with fabric reinforcements and mold release sheets which are adhesively prebonded composites-fabric sides in contact with molding medium.

One run in each category was conducted with unencapsulated incendiary filler of the same composition and present in the same amounts as noted in Table 1. These runs are indicated by the legend (e) and illustrate the situation where the molding plastic medium consists essentially of molding plastic, unencapsulated incendiary filler and curing agent. The remaining runs in each category utilize essentially the same molding plastic medium, each molding plastic medium differing from the other (if at all) in the cell wall material used to encapsulate. These runs illustrate the use of a molding plastic medium having an incendiary filler containing at least one encapsulated component. The encapsulation of the aluminum fuel and ammoium perchlorate oxidizer was carried out using standard known phase separation techniques. The capsule cell wall materials are as noted in Table 2 below. The composition of the molding plastic medium employed is given below in Table 1.

platens close, the molding medium is heated and flows outwardly from the center. The platens are brought together until a positive gauge pressure is registered on the spacers at each corner of the press. The pressure is then released and the assembly is removed from the press, transferred onto a tray and placed in a curing oven where it is cured at temperatures of 150 to 170 degrees Fahrenheit for 24 hours. Then the molded articles were removed and allowed to cool to ambient room temperatures, viz., 68 to 77 degrees Fahrenheit. The "Mylar" mold release sheets are then striped from the upper and lower fabric reinforced surfaces.

Press molding procedure (B)

The same molding procedures, materials and curing cycle were employed as in Procedure (A) except that in the lay-up for the mold, the molding plastic medium was placed in intimate contact with the "Mylar" side of the "GT–31" prebonded composite on both the upper and lower surfaces.

Press molding procedure (C)

The same molding procedures, curing cycle, molding plastic medium and mold release sheet material were employed as in Procedure (D) except that: the woven fabric was a one-sixteenth inch thick polypropylene woven fabric, the mold release sheet was a 1.0 mil thick "Mylar" film, and the woven fabric reinforcement was not prebonded to the "Mylar." The woven fabric was placed on the "Mylar," then the molding plastic medium was pressed in intimate contact with the lower fabric then an upper fabric layer was placed on top of the molding medium followed by an upper "Mylar" sheet on the upper fabric layer.

TABLE 1

| Component | Particle size (microns) | Purpose | Amount (grams) | Form |
|---|---|---|---|---|
| Aluminum | 10 | Fuel | 200 | Encapsulated. |
| Ammonium perchlorate | 100–200 | Oxidizer | 300 | Do. |
| $Fe_3O_4$ | 50–100 | do | 300 | Unencapsulated. |
| "Epon 826"* | | Molding plastic (binder) | 200 | Do. |
| "Epon curing agent Z" (amine curing agent) | | Curing agent | 50 | Do. |

*"Epon 826" is a commercially available epoxy resin produced as a condensation product of epichlorohydrin and "Bisphenol-A" and having diglycidyl ether groups.

The molding plastic medium is prepared for use by mixing the components thereof in a standard one gallon Hobart mixer for a sufficient period to insure adequate mixing.

Press molding procedure (D)

Once mixing is completed, from 150 to 170 grams of the molding plastic medium are placed on the center of an 11 inch by 10 inch prebonded composite "GT–31" while making certain that the fabric side and molding medium are in intimate contact. A second sheet of "GT–31" is then placed over the top of the molding medium in the same manner. "GT–31" is an adhesively prebonded laminated composite of woven "Dacron" fabric adhered to 0.7 mil thick "Mylar" film with a conventional polyester adhesive, and is available commercially from Schjeldahl Corporation. A spacer of the desired thickness is placed at each corner of the sandwich between the reinforcing sheets.

The sandwich is then place betwen the plates of a platen press (whose platens are preheated to 150–170 degrees Fahrenheit). The press is then closed slowly. As the Casting procedure (A)

After mixing, the molding plastic medium was placed by hand into a casting mold and pressed therein. Prior to inserting the molding medium into the mold, the mold is lined with "Mylar" sheets 0.7 to 1.0 mil thick. The molding plastic medium is then smoothed with a spatula and covered with an additional "Mylar" sheet. A mold cover plate is then bolted in place and the mold is heated to temperatures of 150 to 170 degrees Fahrenheit for 24 hours. Then the mold is allowed to cool, the molded article is removed and the mold release sheets are stripped therefrom.

The molded articles, formed according to Molding Procedures (A), (B), (C) and (D) were then tested for flexural strength, resistance to water absorption, surface resistivity and volume resistivity all according to the same known test procedure for determining each property. Additionally the appearance, especially the condition of the upper and lower surfaces, of the molded articles was carefully observed. The pertinent data are reported below in Table 2.

TABLE 2 (COMPARISON OF PROPERTIES OF MOLDED ARTICLES)

| Cell wall material | Phase wt. ratio I.P. to cell wall | Flexural strength, K p.s.i. | Water absorption, wt. percent | Surface resistivity, megohms/ cm.$^2$ | Volume resistivity, megohms/ cm.$^2$ | Total incendiary, wt. percent | Appearance |
|---|---|---|---|---|---|---|---|
| (A) Cast boards—unreinforced: | | | | | | | |
| ———— | ———— | 9.14 | 2.91 | $1.8 \times 10^6$ | $5.4 \times 10^7$ | 77.6 | Voids-uneven.[e] |
| "Saran" | 30/1 | 6.34 | 0.59 | $1.3 \times 10^6$ | $7.7 \times 10^5$ | 75.4 | Do. |
| | 10/1 | 5.61 | 0.78 | $2.6 \times 10^7$ | $7.1 \times 10^7$ | 69.9 | Voids-wavy. |
| "Lexan" | 30/1 | 5.53 | 5.87 | $5.2 \times 10^6$ | $4.7 \times 10^2$ | 75.4 | Do. |
| "Parlon" | 30/1 | 6.50 | 8.90 | $2.4 \times 10^1$ | $4.3 \times 10^{-1}$ | 75.4 | Do. |
| (B) Pressed boards—unreinforced: | | | | | | | |
| ———— | ———— | 8.38 | 0.35 | $2.2 \times 10^7$ | $5.7 \times 10^7$ | 77.6 | Small voids.[e] |
| "Saran" | 30/1 | 6.78 | 0.45 | $1.7 \times 10^7$ | $5.6 \times 10^7$ | 75.4 | Do. |
| | 10/1 | 6.77 | 1.87 | $1.7 \times 10^7$ | $1.0 \times 10^5$ | 69.9 | Do. |
| "Lexan" | 30/1 | 6.70 | 1.09 | $2.8 \times 10^7$ | $2.6 \times 10^4$ | 75.4 | Do. |
| "Parlon" | 30/1 | 6.24 | 3.64 | $1.8 \ 10^7$ | $5.2 \times 10^7$ | 75.4 | Do. |
| (C) Pressed boards—reinforced—not prebonded: | | | | | | | |
| ———— | ———— | 9.73 | ND | ND | ND | 76.0 | Distorted-wavy,[c] voids.[a] |
| "Saran" | 30/1 | 8.51 | ND | ND | ND | 66.1 | Distorted-wavy; voids.[a] |
| Do | 30/1 | 9.54 | ND | ND | ND | 66.2 | Distorted-wavy; [b] voids. |
| Do | 30/1 | 8.53 | ND | ND | ND | 55.4 | Distorted-wavy,[c] voids. |
| (D) Pressed boards—reinforced—prebonded [d]: | | | | | | | |
| ———— | ———— | 9.03 | 0.32 | $1.6 \times 10^7$ | $5.0 \times 10^7$ | 77.6 | Smooth-glassy.[e] |
| "Saran" | 30/1 | 7.96 | 0.34 | $1.7 \times 10^7$ | $5.0 \times 10^7$ | 75.4 | Do. |
| | 10/1 | 8.73 | 0.34 | $1.5 \times 10^7$ | $4.4 \times 10^7$ | 69.9 | Do. |
| "Lexan" | 30/1 | 8.44 | 0.40 | $1.3 \times 10^7$ | $4.9 \times 10^7$ | 75.4 | Do. |
| "Parlon" | 30/1 | 77.6 | 0.52 | $1.4 \times 10^7$ | $4.6 \times 10^7$ | 75.4 | Do. |

[a] Nylon cloth—1 x 1 mono filament having 40 x 40 threads/inch and weighing 5.70 oz./yd.$^2$
[b] Nylon cloth—1 x 1 mono filament having 25 x 25 threads/inch and weighing 5.63 oz./yd.$^2$
[c] Saran cloth—6/1 mono filament having 46 x 120 threads/inch and weighing 11.00 oz./yd.$^2$
[d] Dacron cloth—1 x 1 mono filament having 85 x 85 threads/inch and weighing 0.80 oz./yd.$^2$
[e] No encapsulated components contained in molding medium.

NOTE.—I.P.=Internal Phase; ND=Not Determined; K p.s.i.=thousands of pounds per square inch.

EXAMPLE 2

This example illustrates use of a different incendiary filler from that of Example 1. The molding procedure employed was Press Molding Procedure (D) in accordance with Example 1 and "GT–31" prebonded composites were used to provide the fabric reinforcement and mold release. The molding plastic medium was as follows:

| Component | Particle size (microns) | Purpose | Amount (grams) | Form |
|---|---|---|---|---|
| Boron | 10–50 | Fuel | 50 | U |
| CaSi$_2$ | 200–500 | do | 50 | U |
| Pb$_3$O$_4$ | 50–100 | Oxidizer | 130 | U |
| KClO$_4$ | 100–200 | do | 510 | E |
| "Epon 826" | | Molding plastic | 210 | U |
| "Epon Curing Agent Z." | | Curing agent | 50 | U |

NOTE.—U=unencapsulated; E=encapsulated with "Saran" cell wall material.

The properties of this molded article are given in Table 3 below.

TABLE 3

Cell wall material: "Saran"
Phase wt. ratio I.P. to cell wall: 30/1
Flexural strength, K p.s.i. 9.64
Water absorption, wt. percent: 0.35
Surface resistivity megohms/cm.$^2$: $6.0 \times 10^7$
Volume resistivity megohms/cm.$^2$: $6.7 \times 10^7$
Total incendiary, wt. percent: 75.4
Appearance: smooth-glassy

EXAMPLE 3

This example illustrates a forming procedure in accordance with this invention utilizing a centrally positioned fabric reinforcement in addition to surface reinforcement.

Two molded, fabric-reinforced articles were prepared. One (Run 1) was prepared, press molded and cured in accordance with and using the same materials as in Press Molding Procedure (D) of Example 1. Another (Run 2) was prepared and press molded in accordance with and using the same materials as in Press Molding Procedure (D) of Example 1. However, after the press molding and before curing, the woven fabric portions of the upper and lower "GT–31" composites were gripped and pulled to peel the article apart (approximately in half). Then an additional woven fabric reinforcement (woven glass fabric previously impregnated with epoxy binder) was placed therebetween and the sandwich was reassembled with the fabric in contact with the molding plastic medium on both sides thereof. The thus formed assembly was then pressed to the desired thickness and cured in accordance with (D) of Example 1.

Upon the removal of the "Mylar" mold release sheets, the molded articles of Runs 1 and 2 were tested for flexural strength and dielectric breakdown in accordance with known procedures. Additionally the appearance thereof was observed to determine if they would be satisfactory for use as circuit board substrates. The test results are summarized below in Table 4.

TABLE 4

| | Run 1 | Run 2 |
|---|---|---|
| Fabric reinforcement | Dacron [1] | Dacron.[2] |
| Capsule cell wall material | "Saran" | "Saran." |
| Phase wt. ratio I.P. to cell wall | 30/1 | 30/1. |
| Wt. percent incendiary filler | 75.4 | 66.7. |
| Dielectric breakdown (kilovolts to break) | 1.75 | 6.50. |
| Flexural strength (K p.s.i.) | 7.96 | 13.00. |
| Appearance | Smooth, glassy | Smooth, glassy. |

[1] Both surfaces.
[2] Both surfaces, plus glass cloth in center.

The molded articles of both Runs 1 and 2 were very satisfactory for use as circuit boards as will be noted from Table 4, the flexural strength and dielectric breakdown were improved significantly by incorporation of the woven glass fabric reinforcement in the central region (Run 2).

Alternatively the articles of Runs 1 and 2 can be formed by calendering which offers the additional advantage of continuous operation. When producing the article of Run 1 by calendering, the molding plastic medium is extruded or otherwise deposited between moving layers of prebonded fabric reinforcement-mold release layer composite with the fabric sides facing the molding medium. Rollers or pressure-biased endless belts then press the fabric in intimate contact with the molding medium and press the article to the desired approximate thickness. The articles can be cut to the desired size either prior to or after curing (as the molded fabric reinforced articles are readily cut with a shear blade).

When producing articles having both surface fabric reinforcement and central fabric reinforcement by calendering, the supply of molding plastic medium is divided into two approximately equal portions and fed in approximately equal amounts to the upward facing fabric side of the lower prebonded composite layer and the upward facing side of the central fabric reinforcement. The three fabric layers (upper prebonded composite, central fabric reinforcement and lower prebonded composite) are then pressed together by rollers or belts to press the fabric of all three layers in intimate contact with the molding plastic medium. Cutting and curing are then conducted with either being performed first.

What is claimed is:

1. A method for forming, in a mold, molded plastic articles having fabric reinforcement in at least one surface region thereof which comprises
   (1) positioning a composite of
      (A) mold release material, which is substantially impervious to non-solvent liquids, in coherent form and is prebonded to
      (B) fabric reinforcement in contact with a plastic medium to be molded with said reinforcing fabric in contact with said plastic medium to be molded in a surface region thereof to be reinforced; the mold release material being positioned at all areas of contact between the mold and the article to be molded;
   (2) molding the article with heat to firmly unite said fabric reinforcement and said plastic medium, and
   (3) thereafter removing said mold release material from the fabric (surface) reinforced molded article.

2. A method as in claim 1 wherein said fabric reinforcement is a woven fabric.

3. A method as in claim 1 wherein said fabric is a polyester fabric.

4. A method as in claim 1 wherein said mold release material is a polyester.

5. A method as in claim 1 wherein said molding plastic medium includes an epoxy resin.

6. A method as in claim 1 wherein said prebonding of (A) and (B) has been accomplished by an adhesive whose bond strength subsequent to said molding is low compared to the strength of the molded article wherein delamination of said mold release material can occur without significant surface deformation of the molded article in said reinforced surface region.

7. A method for forming molded plastic articles of a configuration having the major surfaces essentially parallel and distinctly greater in size than the minor surfaces and having fabric reinforcement in both the upper and lower major surface regions thereof which comprises
   (1) positioning a composite of
      (A) a mold release sheet which is substantially impervious to non-solvent liquids and is adhesively prebonded to
      (B) woven fabric reinforcement in contact with each of the upper and lower major surfaces of a molding plastic medium to be molded with said fabric side in contact with said plastic medium;
   (2) molding the article with heat to consolidate said fabric reinforcement and said plastic medium into a unitary structure and
   (3) thereafter stripping said mold release sheets from the fabric-reinforced surface regions of said molded article.

8. A method as in claim 7 wherein (A) and (B) are adhesively prebonded throughout at least a predominant portion of their mutual interfacial surface extents prior to molding.

9. A method as in claim 7 wherein said prebonding adhesive subsequent to molding has a bond strength less than about 5 p.p.i.

10. A method as in claim 7 wherein said molding is low pressure press molding.

11. A method as in claim 7 wherein said plastic medium to be molded contains an incendiary filler having at least one encapsulated component.

12. A method for forming, in a mold, a molded circuit board which comprises
   (1) positioning at least one adhesively prebonded composite of
      (A) a mold release sheet which is substantially impervious to non-solvent liquids and is adhesively prebonded to
      (B) woven fabric reinforcement substantially co-extensive therewith in contact with a plastic medium to be molded to be reinforced to define a major surface region thereof; the mold release material being positioned at all areas of contact between the mold and the article to be molded;
   (2) molding the article with heat to consolidate said woven fabric reinforcement with said surface region of said plastic medium in a unitary structure;
   (3) thereafter stripping said mold release sheet from said fabric-reinforced surface region of said molded article and
   (4) then establishing an electroconductive portion on said stripped surface.

13. A method as in claim 12 wherein said plastic medium includes an epoxy resin.

14. A method as in claim 12 wherein said adhesively prebonded composites are positioned in contact with said plastic medium to be molded to define both upper and lower major surface regions of said molded circuit board and wherein subsequent to stripping the mold release sheets from both fabric (surface) reinforced reigons, an electroconductive portion is established on at least one of said stripped surfaces.

15. A method as in claim 14 wherein an electroconductive portion is established on each of said upper and lower stripped surfaces.

16. A method as in claim 13 wherein said woven fabric reinforcement is comprised of polyethylene glycol terephthalate, said mold release sheet is comprised of polyethylene glycol terephthalate and said prebonding adhesive is a polyester whose bond strength subsequent to said molding is sufficiently low to permit stripping of said mold release sheet without significant surface deformation of said molded article in said surface reinforced region.

17. A method as in claim 12 wherein said molding medium includes an incendiary filler containing at least one encapsulated component.

18. A method as in claim 12 which includes placing at least one fabric reinforcement layer in the central region of said molding medium prior to molding.

References Cited
UNITED STATES PATENTS

| | | | |
|---|---|---|---|
| 3,263,613 | 8/1966 | Rice et al. | 264—3 X |
| 3,338,990 | 8/1967 | Rice et al. | 264—3 |

BENJAMIN R. PADGETT, Primary Examiner

S. J. LECHERT, Jr., Assistant Examiner

U.S. Cl. X.R.

156—247, 289; 109—36; 264—3, 104, 300

UNITED STATES PATENT OFFICE
CERTIFICATE OF CORRECTION

Patent No. 3,674,589                    Dated July 4, 1972

Inventor(s) Carl K. Schaab, George T. Weyrauch and Terry R. Davis

It is certified that error appears in the above-identified patent and that said Letters Patent are hereby corrected as shown below:

Claim 5, line 1, "said molding plastic" should be --said plastic--.

Claim 7, line 12, "molding plastic" should be --plastic--.

Claim 12, line 3, "one adhesively prebonded com-" should be --one com- --.

Signed and sealed this 5th day of December 1972.

(SEAL)
Attest:

EDWARD M. FLETCHER, JR.           ROBERT GOTTSCHALK
Attesting Officer                  Commissioner of Patents

X-1191-67  2-13-70  NCR